Jan. 18, 1955 M. G. REYES 2,699,752
BIRD FEEDING HOPPER
Filed Dec. 23, 1953
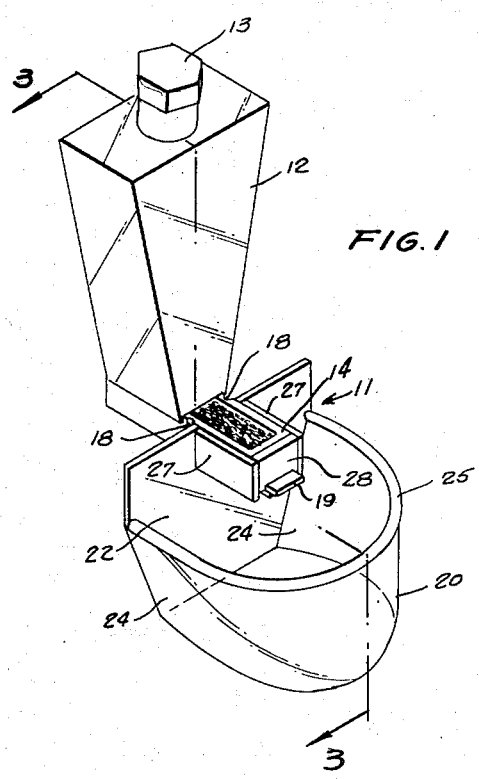
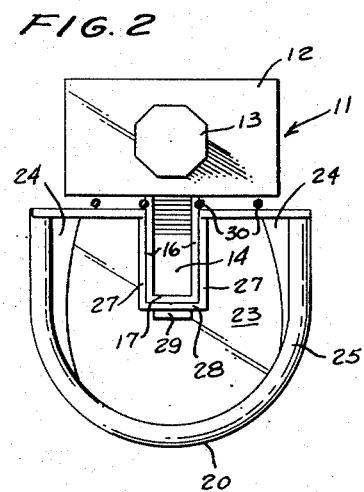
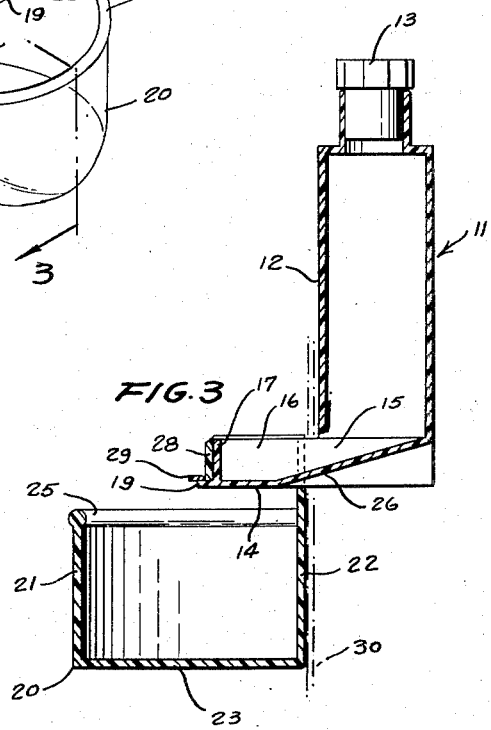
INVENTOR.
MARCELO G. REYES
BY
McMorrow, Berman + Davidson
ATTORNEYS

United States Patent Office 2,699,752
Patented Jan. 18, 1955

2,699,752

BIRD FEEDING HOPPER

Marcelo G. Reyes, Chicago, Ill.

Application December 23, 1953, Serial No. 399,894

3 Claims. (Cl. 119—18)

This invention relates to bird feeding devices, and more particularly to an improved bird feeding device for use in a bird cage.

The main object of the invention is to provide a novel and improved bird feeding hopper device for use in a bird cage, said device being simple in construction, being easy to install in a bird cage, and providing a dependable means for supplying a caged bird with water, bird seed or other solid or liquid feed material.

A further object of the invention is to provide an improved bird feeding device for use in a bird cage, said device being inexpensive to manufacture, being sturdy in construction, being neat in appearance, and being easy to maintain in a clean and sanitary condition.

Further objects and advantages of the invention will become apparent from the following description and claims, and from the accompanying drawings, wherein:

Figure 1 is a perspective view of an assembled bird feeding device constructed in accordance with the present invention.

Figure 2 is a top plan view of the bird feeding device shown in Figure 1.

Figure 3 is a vertical cross sectional view taken on the line 3—3 of Figure 1.

Referring to the drawings, the bird feeding device is designated generally at 11 and comprises an upstanding reservoir member 12 of suitable material, preferably of transparent plastic material so that the interior of the reservoir will be readily visible at all times. The reservoir member 12 is provided with the removable, sealingly fitting, top cover plug 13. The lower portion of the reservoir comprises an outwardly projecting tray element 14 which communicates with the bottom portion of the interior of the reservoir member by a passage 15, as shown in Figure 3.

As shown in Figure 2, the tray member 14 is generally rectangular in shape and is provided with the upstanding side walls 16, 16 and the upstanding transverse front wall 17. The side walls 16, 16 are formed adjacent the upstanding reservoir member 12 with the respective outwardly facing vertical grooves 18, 18 which are adapted to receive and to be lockingly engaged between a pair of adjacent vertical wires of a bird cage, for supporting the upstanding reservoir member 12 externally adjacent to the cage with its tray portion 14 projecting inside the cage.

The bottom wall of the tray element 14 projects outwardly a substantial distance beyond the transverse upstanding wall 17 thereof, to define a flange 19. Designated at 20 is a receptacle having a generally U-shaped main wall 21, a straight rear wall 22 and a flat bottom wall 23. As shown in Figures 1 and 2, the side portions of the U-shaped main wall 21 converge downwardly, as shown at 24, 24 in Figures 1 and 2. The top edge of the U-shaped main wall 21 is provided with the rounded bead 25 defining a perch for a bird, whereby the bird may support itself over the receptacle 20.

The rear wall 22 of the receptacle 20 extends upwardly a substantial distance beyond the plane of the marginal bead 25 and is formed with a rectangular notch 26 in which the tray member 14 is receivable. Rigidly secured to the wall 22 at the respective sides of the notch 26 are the respective inwardly projecting parallel arms 27, 27 which are rigidly connected at their forward end portions by a transverse bar element 28, thereby defining a generally U-shaped member receiving the upstanding walls of the tray member 14. As shown in Figure 3, the transverse bar element 28 is engageable on the flange 19. Secured on said flange parallel to the upstanding transverse wall 17 is an abutment strip 29 defining a groove between the strip 29 and the wall 17 in which the transverse bar member 28 is receivable, as shown in Figure 3, to secure the receptacle 20 on the flange 19. When thus supported on flange 19, the weight of the receptacle 20 serves to maintain said receptacle in a substantially upright position with the rear wall 22 thereof engaging against the cage wires, shown at 30 in Figure 3.

In installing the device, the tray member 14 is first introduced between a pair of adjacent wires of the cage, in the manner above illustrated, the wires being engaged in the grooves 18, 18 to secure the reservoir member 12 externally adjacent the cage with the tray member 14 thereof projecting into the cage. The receptacle 20 is then engaged on the tray member by engaging the U-shaped element defined by members 27, 27 and 28 over the walls of the tray member and engaging the transverse bar member in the groove defined between strips 29 and transverse wall 17. As above explained, the receptacle 20 will thus be supported with its upstanding rear wall 22 engaging against the cage wires 30.

Feed material or water may be introduced into the reservoir member 12 through the tray member 14 with said reservoir in horizontal position and the plug 14 in place. When the reservoir member is in its upright position, feed material or water will gravitate downwardly into the tray member 14, where it becomes available to the occupant of the cage. The bird thus obtains access to the feed material by perching on the U-shaped rim 25 of the receptacle 20.

Refuse such as seed hulls and the like will drop into the receptacle 20. When it is desired to empty the receptacle, it is merely necessary to disengage the receptacle from the tray member 14 by following a procedure reverse to that above described, whereupon the receptacle may be removed from the cage, may be readily emptied, may be cleaned, and may be then replaced on the tray member 14 in the manner above described.

While a specific embodiment of an improved bird feeding device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A bird feeding device comprising an upstanding reservoir, an outwardly projecting tray element at the lower end of said reservoir and communicating therewith, means on the opposite sides of said tray element lockingly engageable between a pair of adjacent vertical wires of a bird cage, an outwardly projecting flange on the end of said tray element, a receptacle having a rear wall notched at its upper portion to receive said tray element, and means carried by said upper portion embracing said tray element and coacting with said flange to support the receptacle beneath the tray element.

2. A bird feeding device comprising an upstanding reservoir, an outwardly projecting tray element at the lower end of said reservoir and communicating therewith, means on the opposite sides of said tray element lockingly engageable between a pair of adjacent vertical wires of a bird cage, an outwardly projecting flange on the end of said tray element, a receptacle having a bottom wall, side walls and a rear wall, said rear wall being notched at its upper portion to receive said tray element, and a U-shaped member rigidly secured to said upper portion and arranged to surround said tray element, the bight portion of said U-shaped member being engageable on said flange to support the receptacle beneath the tray element.

3. A bird feeding device comprising an upstanding reservoir, an outwardly projecting tray element formed integrally with the lower end of said reservoir and communicating therewith, means on the opposite sides of said tray element lockingly engageable between a pair of adjacent vertical wires of a bird cage, an outwardly projecting flange on the end of said tray element, a receptacle having a bottom wall, side walls and a rear wall, said rear wall being notched at its upper portion to receive said tray element, a U-shaped member rigidly secured to said upper portion and arranged to surround said tray element, the bight portion of said U-shaped member being engageable on said flange to support the receptacle beneath the tray element, and an abutment element on said flange spaced from the adjacent wall of the tray element to define a groove to receive said bight portion.

References Cited in the file of this patent

UNITED STATES PATENTS

| | | |
|---|---|---|
| 1,239,151 | Woods | Sept. 4, 1917 |
| 1,446,740 | Eummelen | Feb. 27, 1923 |
| 1,528,413 | Frest | Mar. 3, 1925 |
| 1,718,432 | Qualmann | June 25, 1929 |
| 1,755,706 | St. George | Apr. 22, 1930 |
| 1,878,893 | Rotberg | Sept. 20, 1932 |
| 2,532,726 | Lajoie et al. | Dec. 5, 1950 |

FOREIGN PATENTS

| | | |
|---|---|---|
| 835,745 | France | Oct. 3, 1938 |